United States Patent [19]
Haber et al.

[11] Patent Number: 6,072,865
[45] Date of Patent: Jun. 6, 2000

[54] ENHANCED CALL FORWARDING WITH TERMINATION NOTIFICATION

[75] Inventors: Ralph Haber, Lewisville, Tex.; Atousa Raissyan, Fairfax, Va.

[73] Assignee: MCI Communications Corporation, Washington, D.C.

[21] Appl. No.: 09/046,188

[22] Filed: Mar. 23, 1998

[51] Int. Cl.[7] .................................................. H04M 3/42
[52] U.S. Cl. ........................ 379/211; 379/201; 379/215; 370/352
[58] Field of Search .................................... 379/211, 210, 379/212, 201, 217, 215; 455/406, 407, 408; 370/352

[56] References Cited

U.S. PATENT DOCUMENTS

| | | | |
|---|---|---|---|
| 4,313,035 | 1/1982 | Jordan et al. ............................ | 379/211 |
| 4,771,461 | 9/1988 | Matyas .................................... | 380/282 |
| 5,377,191 | 12/1994 | Farrell et al. ............................ | 370/401 |
| 5,764,747 | 6/1998 | Yue et al. ................................ | 379/210 |
| 5,907,800 | 5/1999 | Johnson et al. ......................... | 379/114 |

*Primary Examiner*—Krista Zele
*Assistant Examiner*—Benny Q. Tieu

[57] ABSTRACT

A telephone call processing system and method includes and involves a data storage sub-system for storing call routing and forwarding information, and a data processing and call switching system that is coupled to the data storage sub-system. The data processing and call switching system is operable to receive an instruction from a subscriber to a call forwarding service provided within the telephone call processing system to forward calls intended for the subscriber to a call termination location having a telephone system network address for a particular period of time, to store the network address in the data storage sub-system, to receive a call intended for the subscriber, to retrieve the network address from the data storage sub-system in response to the call, to route the call to the telephone system network address, and to initiate and route a notification call to the telephone system network address after the particular period of time expires. The notification call is intended to be received by the subscriber at the call termination location and to notify the subscriber that the period of time has expired.

30 Claims, 6 Drawing Sheets

ENHANCED CALL FORWARDING WITH TERMINATION NOTIFICATION

BACKGROUND OF THE INVENTION

1. Field of the Invention

The present invention relates to enhanced telephone call processing services and features such as call forwarding.

2. Description of the Related Art

Modern call processing and switching systems have given rise to many enhanced call processing services and features such as call forwarding, call waiting, caller identification, and a host of others. These enhanced call processing services and features are made possible through use of intelligent, programmable call routing and switching systems, such as CENTREX type switches which support activation of existing telephone switch feature group functions.

Call forwarding is a commonly used and implemented enhanced call processing feature. Call forwarding was invented to provide seamless communications by allowing a person to receive calls at more than one call termination location by causing a switching system to route calls to alternate telephone stations. It is quite common, for example, for a person to forward his calls to an alternate call termination location when he knows that he will be away from his home or office for an extended period of time. Typically, the person will call a service access number or dial a special access number (e.g., "*72") from a telephone station to access an enhanced feature menu of an appropriate system. At such a menu, the person can cause his calls to be routed to alternate call termination locations by specifying telephone numbers or network addresses where he intends to receive his calls.

Despite the many benefits afforded by call forwarding, current implementations have certain drawbacks that continue to frustrate the problem that call forwarding systems attempt to address—seamless communications. For example, many call forwarding systems are configured such that after a person forwards his calls to an alternate call termination location, he must specifically remember to later reset or terminate call forwarding so that he can again receive calls at his normal call termination location. In other words, typical call forwarding systems are configured to forward calls to a person's specified alternate call termination location indefinitely and until otherwise re-programmed, reset, or cancelled. As such, if a person forgets to reset his call forwarding parameters (e.g., his "forward-to" number), calls will continue to be routed to his alternate call termination location regardless of his present location.

Numerous attempts to improve call forwarding systems and features like those mentioned above have been made. No such attempt, however, truly achieves seamless communications. For example, in U.S. Pat. No. 5,610,970 to Fuller, et al. a system is provided wherein subscribers of enhanced call processing features such as call forwarding can establish schedules whereby certain enhanced features are turned on and off based on subscriber-specified times. For example, a subscriber may pre-establish a daily schedule such that call forwarding will remain in effect from 3:00 p.m. until 4:00 p.m. every Tuesday and Thursday of every week to forward calls from the subscriber's home to his cellular telephone during the time when he picks his kids up from school and is away from his home or office. Additionally, a feature timer may be set to initiate a feature such as call forwarding when a subscriber has to unexpectedly leave his office and run and errand. After termination of the time period specified by the feature timer, the system of the '970 either will resort to normal, scheduled enhanced feature invocation or to a specified mode of call processing (e.g., call waiting, regular non-feature based call routing, etc.).

Although there are certain benefits provided by a system such as the one disclosed in the '970 patent, setting time periods during which certain enhanced call processing features will remain in effect and the use of special feature-timers do little to provide seamless communications. In essence, such systems attempt to make a subscriber run his life according to a pre-arranged schedule in the hope that if he adheres to such a schedule, he will receive his calls. Unfortunately, however, if a subscriber varies in any way from his pre-arranged schedule, he may miss his calls.

Thus, there exists a need to provide an improved enhanced call processing system wherein an enhanced call processing feature such as call forwarding may remain in effect for a subscriber-specified period of time and wherein the subscriber can be notified that the period of time has or is about to expire and then be given the opportunity to re-establish his call forwarding parameters.

SUMMARY OF THE INVENTION

It is an object of the present invention to solve the aforementioned problems associated with the related art by providing an improved system for the provision of enhanced call processing features such as call forwarding.

It is another object of the present invention to provide seamless communications so that telephone service customers can reliably receive their calls regardless of their location and without requiring them to constantly remember, monitor, and control enhanced service features.

It is yet another object of the present invention to allow subscribers of enhanced call processing services and features such as call forwarding to establish time periods during which such enhanced features are to remain in effect and to receive an automatically generated notification call indicating that such time periods have or are about to expire.

The present invention has achieved such objects and, in so doing, has provided certain benefits in terms of call processing and seamless communications. For example, a person can now instruct his call forwarding service to forward his calls for a specified period of time and then be provided with an automatically generated notification call that will notify the person that his specified period of time has or is about to expire. Additionally, the person can be given the opportunity to reset his call forwarding parameters (e.g., his "forward-to" number, the amount of time such forward-to number will remain in effect, etc.) upon receiving the notification call. The present invention provides a system and method that allow seamless communications without requiring enhanced service subscribers to constantly manage and remember the parameters that govern the operation of their enhanced telephony services.

The present invention achieves the aforementioned objects and provides the stated exemplary benefits by providing a method for processing a call in a telephone call processing system that includes the steps of receiving an instruction from a subscriber to a call forwarding service provided within the telephone call processing system to forward calls intended for the subscriber to a network address for a particular period of time, receiving a call intended for the subscriber, routing the call to the network address, and initiating and routing a notification call to the network address after the particular period of time expires. The notification call is intended to be received by the subscriber at the network address and to notify the subscriber that the particular period of time has expired.

According to another aspect of the present invention, a telephone call processing system is provided and includes a data storage sub-system for storing call routing and forwarding information, and a data processing and call switching system that is coupled to the data storage sub-system. The data processing and call switching system is operable to receive an instruction from a subscriber to a call forwarding service provided within the telephone call processing system to forward calls intended for the subscriber to a network address for a particular period of time, to store the network address in the data storage sub-system, to receive a call intended for the subscriber, to retrieve the network address from the data storage sub-system in response to the call, to route the call to the network address, and to initiate and route a notification call to the network address after the particular period of time expires. The notification call is intended to be received by the subscriber at the network address and to notify the subscriber that the period of time has expired.

According to another aspect of the present invention, a method for providing a call forwarding service within a telephone call processing system is provided and includes the steps of setting a network address and a time period during which the network address will remain in effect in response to a corresponding instruction from a subscriber to the call forwarding service, and causing a time period termination notification call to be initiated and routed to the network address after the time period expires. The time period termination notification call is intended to be received by the subscriber at the network address and to notify the subscriber that the time period has expired.

According to another aspect of the present invention, a method for providing an enhanced call processing service within a telephone call processing system is provided that includes the steps of initiating an enhanced call processing service in response to a corresponding service request from a subscriber to the enhanced call processing service, setting a time period during which the enhanced call processing service will remain in effect in response to a corresponding instruction from the subscriber, and causing a notification call to be initiated and routed to the subscriber to notify the subscriber that the time period has expired.

According to another aspect of the present invention, a telephone call processing system having a call forwarding capability is provided that includes a data storage sub-system for storing a network address and a time period during which the network address will remain in effect. The network address and the time period are established by a subscriber to a call forwarding service. Also included is a data processing and call switching system that is coupled to the data storage sub-system and which is operable to cause a time period termination notification call to be initiated and routed to the network address after the time period has expired. The time period termination notification call is intended to be received by the subscriber at the network address and to notify the subscriber that the time period has expired.

According to a final aspect of the present invention, a telephone call processing system that incorporates an enhanced call processing capability is provided that includes a data storage sub-system for storing a time period during which an enhanced call processing service will remain in effect. The time period is established by a subscriber to the enhanced call processing service. Also included is a data processing and call switching system that is coupled to the data storage sub-system and which is operable to initiate the enhanced call processing service in response to a corresponding service request received from the subscriber and to cause a notification call to be initiated and routed to the subscriber to notify the subscriber that the time period has expired.

BRIEF DESCRIPTION OF THE DRAWINGS

The present invention is described in detail below with reference to the following drawing figures of which.

DETAILED DESCRIPTION OF THE PREFERRED EMBODIMENTS

Figure 1:
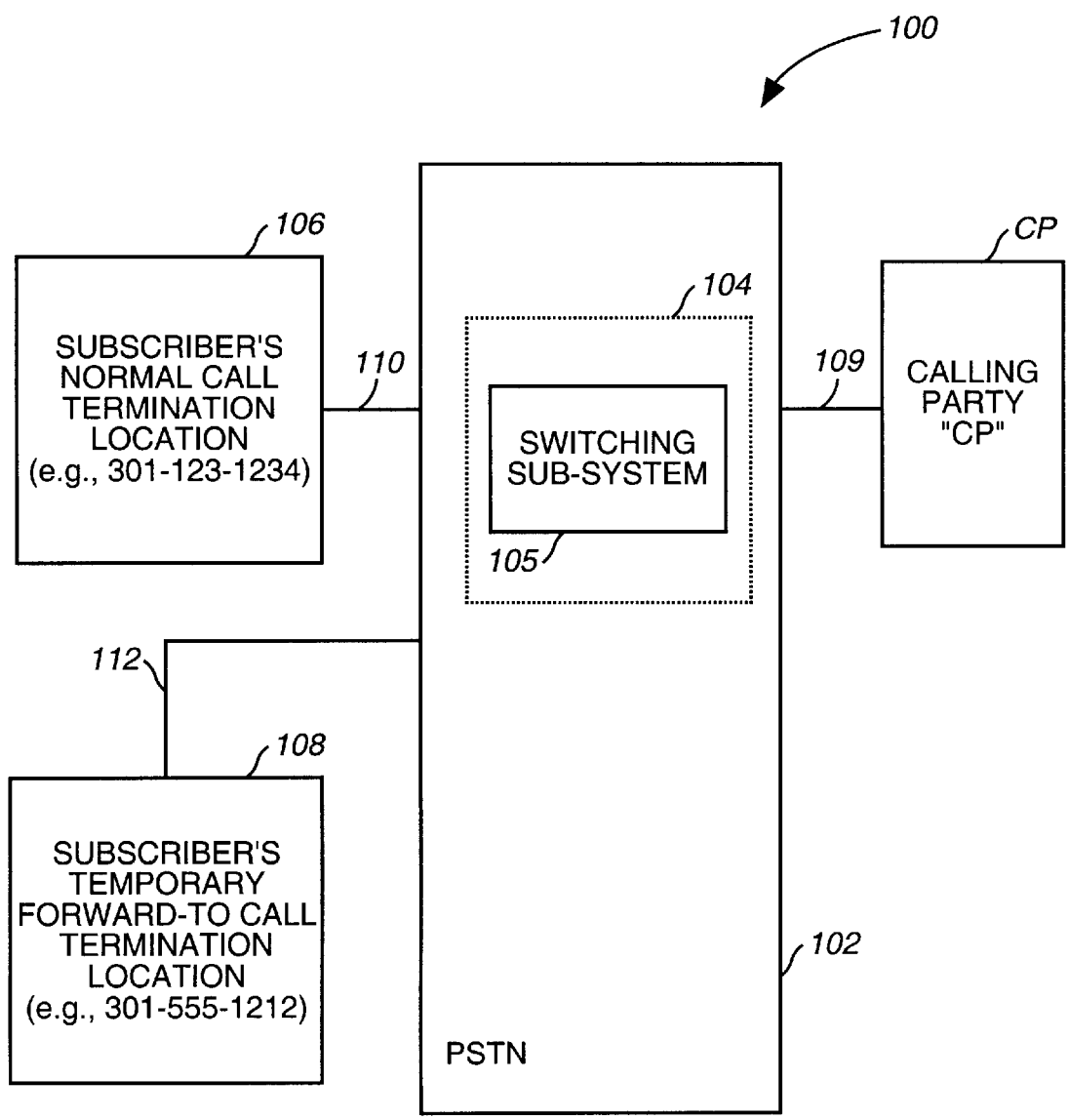
FIG. 1 is a block diagram of a telephone call processing system wherein an enhanced call forwarding service is provided to subscribers according to a preferred embodiment of the present invention.

The present invention is now described in detail with regard to the drawing figures that were briefly described above. Unless otherwise indicated, like parts are referred to with like reference numerals.

For purposes of interpretation, the term "subscriber," unless otherwise indicated herein, means a user of an enhanced call processing service or feature such as a call forwarding service that may be provided by a service provider such as a local exchange carrier (LEC), a long distance carrier, or any other party such as a private party that operates a private telephony system (e.g., a private branch exchange (PBX) system) wherein call forwarding is provided as a telephone system feature.

The following discussions outline the structures and their corresponding operations that enable the provision of enhanced call processing features, systems, and methods according to the present invention. Accordingly, the following discussions illustrate the present invention as it has been applied to call forwarding systems and features. The present invention, however, is not so limited. Other enhanced telephony services and feature group services (e.g., call waiting, call blocking, etc.) that may be implemented by modern telephonic switching systems may take advantage of the novel features of the present invention.

Referring now to FIG. 1, depicted therein is a telephone call processing system that is configured to enable enhanced call processing features such as call forwarding according to a preferred embodiment of the present invention. System 100 is a telephone call processing system wherein calls are originated from telephone stations having telephone system network addresses (hereinafter "network addresses" such a telephone numbers) and processed and routed to receiving telephone stations having corresponding terminal network addresses. More particularly, system 100 will allow a subscriber to a call forwarding service to establish a time period during which call forwarding will remain in effect. After the time period specified by the subscriber expires, he can receive an automatically generated notification call at a specified "forward-to" location. If the subscriber is present at the forward-to location and he receives the notification call (i.e., the notification call is completed), he can be notified that his earlier specified period of time has expired and then be given the opportunity to re-establish his personal call forwarding parameters (e.g., reset the time period, reset the forward-to location, etc.).

Accordingly, in system 100, the publicly switched telephone network (PSTN) 102 includes a switching facility 104 (e.g., a local exchange carrier (LEC)) that further includes a switching sub-system 105 that is configured with CENTREX-type enhanced call feature and automatic call distribution capabilities. It is preferred that an organization such as a local telephone service provider will operate switching facility 104 and, in particular, an enhanced call processing service like call forwarding.

In system 100, a subscriber may receive telephone calls at a terminal telephone station (hereinafter a "telephone station") at his normal call termination location 106 which has a network address such as a telephone number (e.g., 301-123-1234) and at a telephone station at a temporary forward-to call termination location 108 which has a network address such as a telephone number (e.g., 301-555-1212) via facilities 110 and 112, respectively, which are coupled to PSTN 102 and, in particular, to switching facility 104 and switching sub-system 105. A calling party CP is also coupled to PSTN 102 via facility 109. As will be discussed below, calling party CP may originate a call such a voice-based telephone call or a data call via a telephone station or other device capable of originating telephone system calls that are intended to be received by the subscriber.

Facilities 109, 110 and 112 will be readily understood to include land-line facilities, cellular telephone facilities, data link facilities, paging facilities, satellite communications facilities, radio transmission systems, etc. Accordingly, the aforementioned use of the term "telephone station" is intended to mean any type of terminal device that is capable of receiving a telephone system call (e.g., a landline telephone set, a cellular telephone, a pager device, a computing device such as a personal computer that may be coupled to a telephone network via a modem unit, a TTY device, etc.). The implementation of facilities 109, 110, and 112 and their interconnection with PSTN 102 will be readily understood by those skilled in the art.

Although switching facility 104 and switching sub-system 105 operate as part of or with PSTN 102 such as within a central office (CO) facility that operates switching facility 104, switching facility 104 could be part of a private branch exchange (PBX) or other private domain system that provides enhanced call processing features such as call forwarding and the like. Accordingly, there is no requirement that switching facility 104 be a part of PSTN 102 or that it be a part of a CO.

Figure 2:
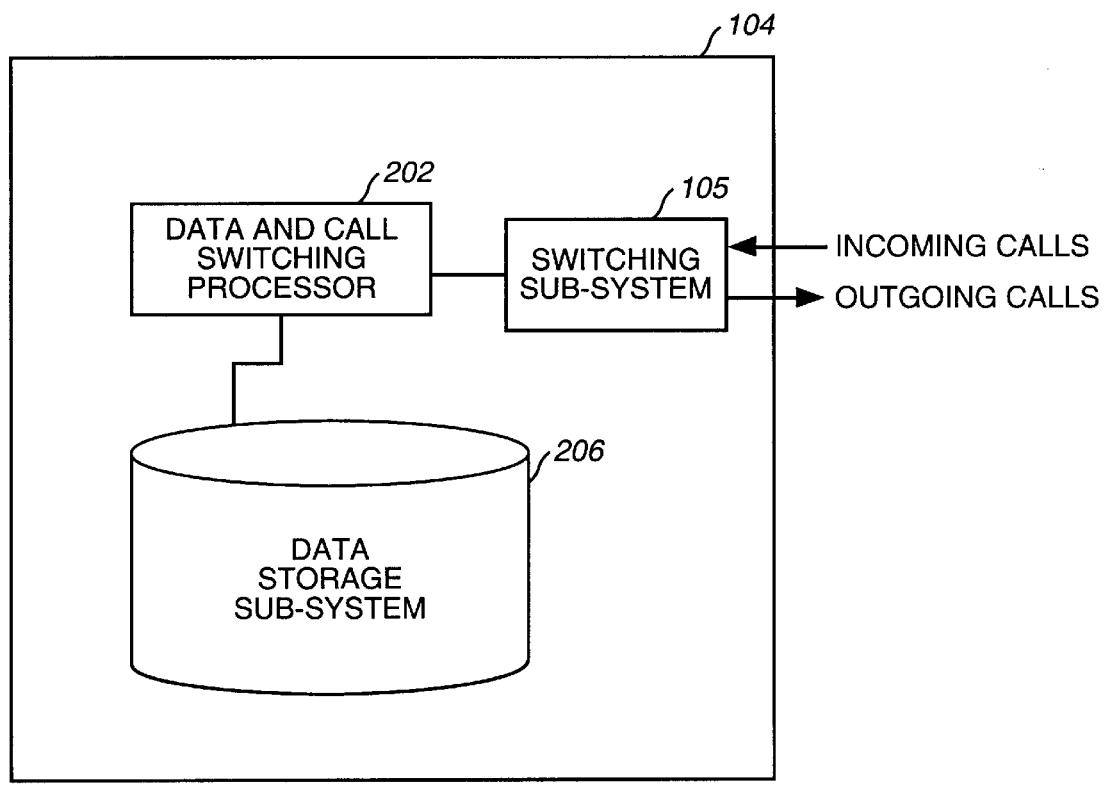
FIG. 2 is a block diagram of the switching facility depicted in FIG. 1.

Referring now to FIG. 2, depicted therein is switching facility 104 and, in particular, the component parts thereof. Switching facility 104 includes a data and call switching processor 202 (e.g., a computer data processing system configured with hardware and software to enable data processing and call switching/management and routing operations) which is coupled to both switching sub-system 105 and a data storage sub-system 206. Switching sub-system 105 may be a telephone call switching system such as the NORTHERN TELECOM DMS-100 or DMS-250 call switching systems (e.g., Class 5 Switches) or any other switching system having similar or like features and which is programmable to enable enhanced call processing features and feature group processing such as call forwarding, etc. Preferably, switching sub-system 206 incorporates a CENTREX capable switch having automatic call distribution (ACD) capabilities. In switching facility 104, incoming and outgoing calls are routed according to pre-programmed operations which are carried out within data and call switching processor 202, data storage sub-system 206, and within the internal processing systems of switching sub-system 105. Switching sub-system 105 may be controlled and programmed in a conventional manner to achieve enhanced feature group functionality.

Data and call switching processor 202 is configured as an automatic data processing system which includes timer circuitry and/or software program controls to enable timer and timing functionality according to the present invention. Such timer and timing functionality is incorporated in the present invention to provide a timer for setting the duration of time that call forwarding features and, possibly, other enhanced telephone service features, will remain in effect. The software programming necessary to provide timer functionality (e.g., sequence, looping, or wait-type constructs such as those that may implemented in the "C" programming language) will be readily understood by those skilled in the art.

The structures depicted in FIGS. 1 and 2 are configured to operate together to provide enhanced call forwarding having a call forwarding timer and a feature termination notification call capability. A subscriber to such a call forwarding service and a calling party such as calling party CP will benefit from the same as described above.

Figure 3A:
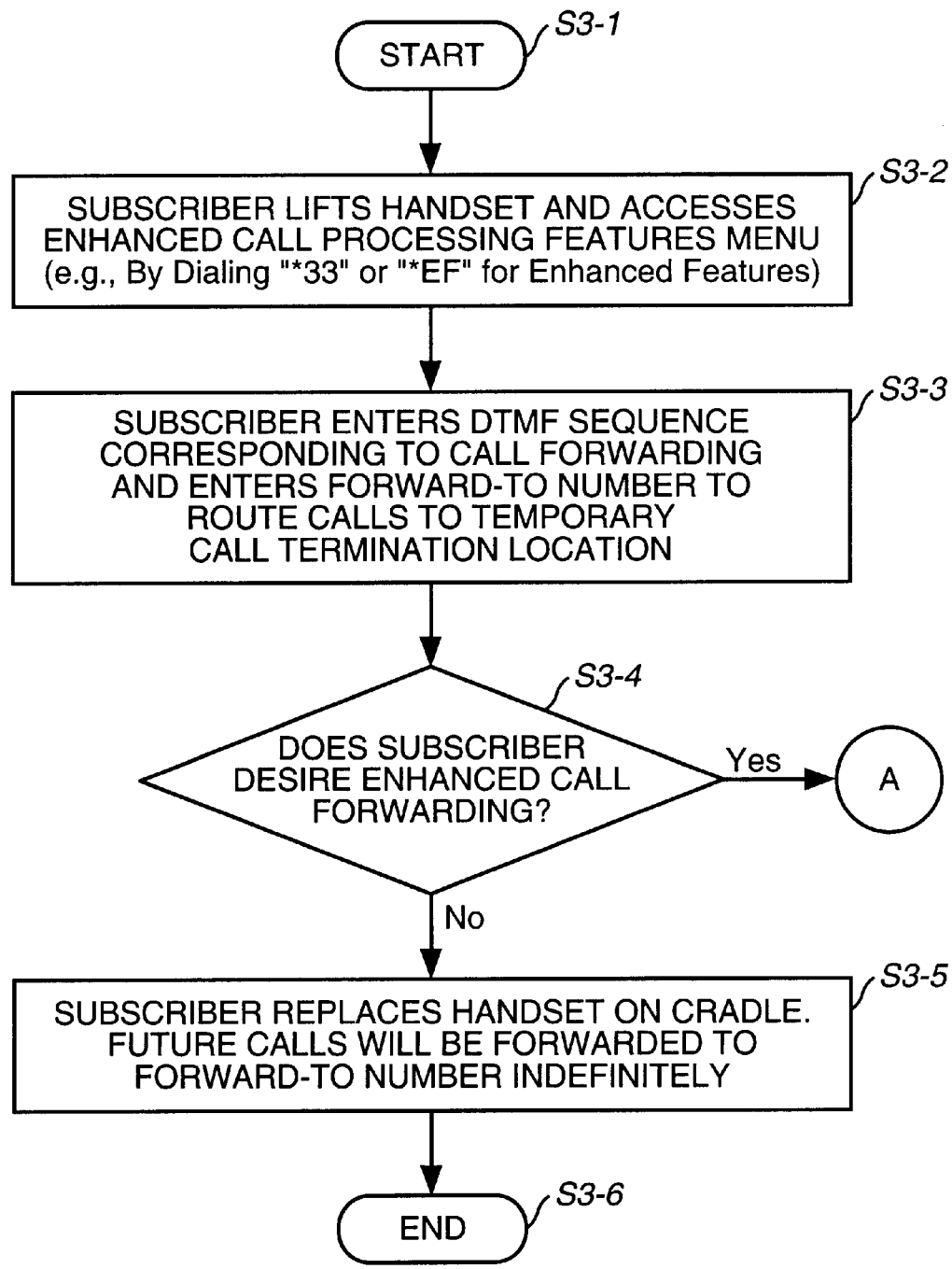
FIG. 3A is a flowchart that illustrates the operations associated with establishing and managing enhanced call forwarding features within the system depicted in FIG. 1 according to a preferred embodiment of the present invention.
Figure 3B:
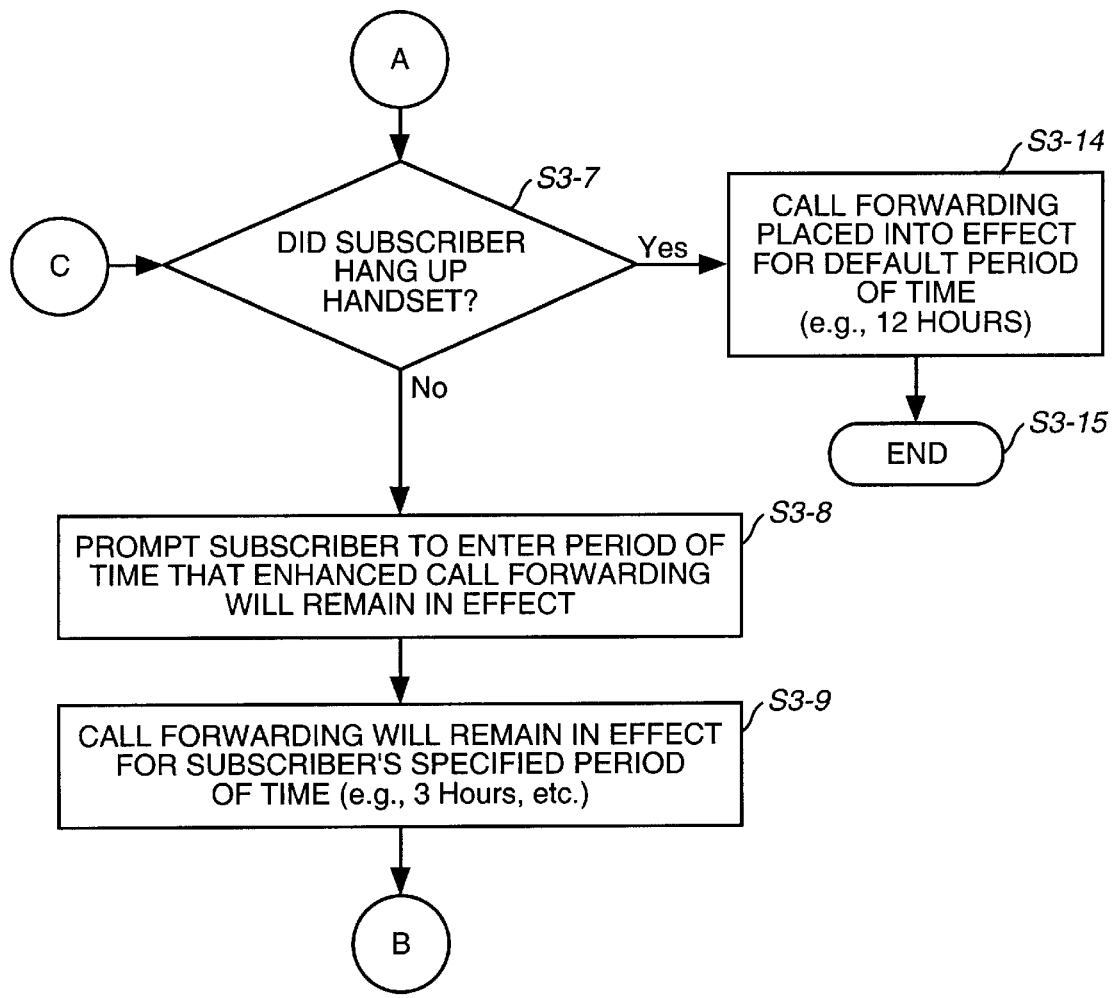
FIG. 3B is a continuation flowchart of the flowchart illustrated in FIG. 3A.
Figure 3C:
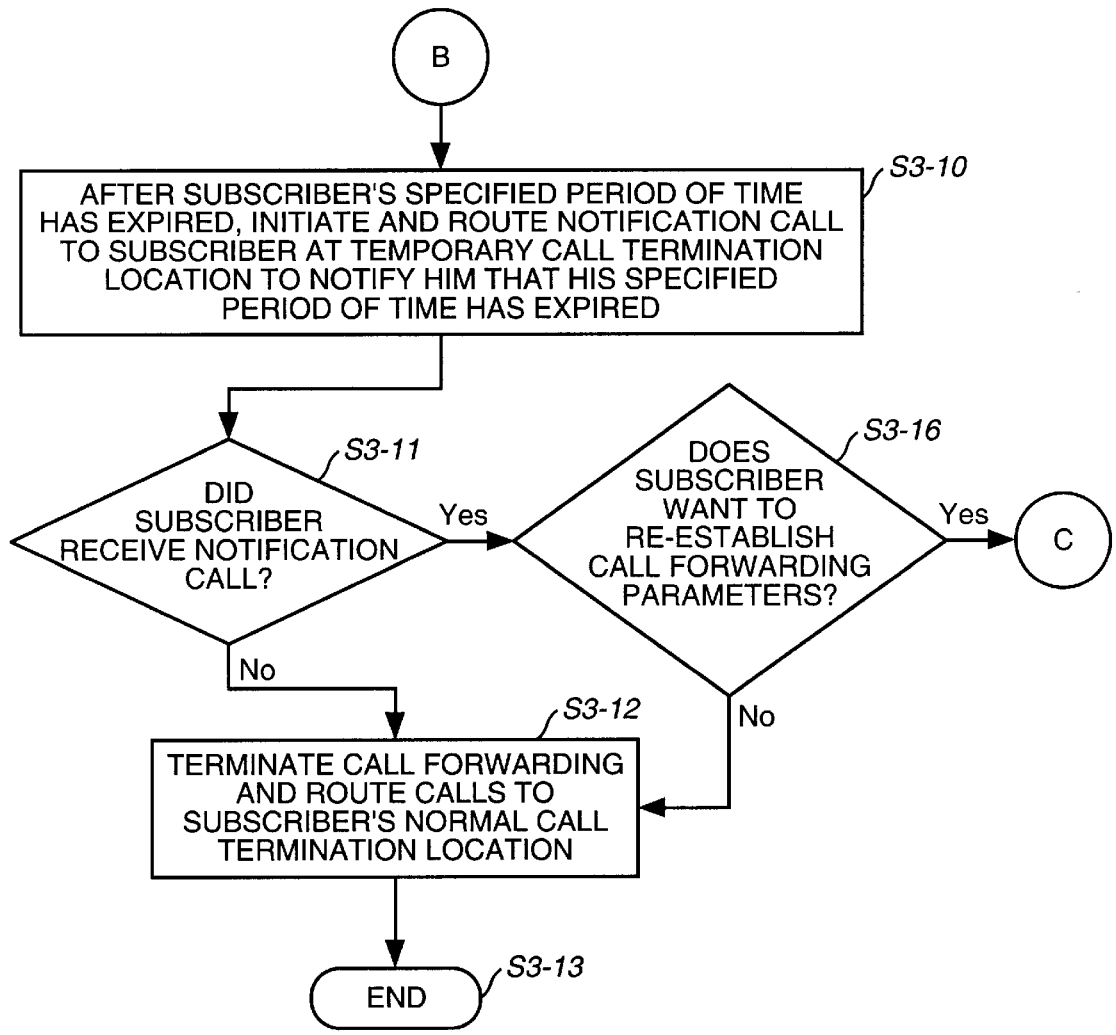
FIG. 3C is a continuation flowchart of the flowchart illustrated in FIGS. 3A and 3B.

Accordingly, referring now to FIGS. 3A, 3B, and 3C, depicted therein is a flow chart that illustrates the operations of a subscriber and the structures within system 100 to establish and manage enhanced call forwarding according to a preferred embodiment of the present invention. Many of the operations depicted in FIGS. 3A, 3B, and 3C are carried out by data and call switching processor 202 in conjunction with data storage sub-system 206 and switching sub-system 105 in accordance with computer software routines and constructs that will be readily apparent after understanding the content found in the following paragraphs.

With specific reference to FIG. 3A, processing starts at Step S3-1 and immediately proceeds to Step S3-2 where a subscriber lifts the handset of a telephone station at his normal call termination location 106 (FIG. 1) and accesses an enhanced call processing features menu such as by dialing a dial tone multiple frequency (DTMF) sequence (e.g., "*78", "*72", or "*CF" for call forwarding). Next, at Step S3-3 the subscriber enters a DTMF sequence corresponding to call forwarding and enters a forward-to number which, for purposes of illustration, corresponds to temporary call forward-to termination location 108 (e.g., 301-555-1212 as depicted in FIG. 1). It should be noted that if data and call switching processor 202 and switching sub-system 105 of switching facility 104 are equipped with CENTREX direct inward dialing digit (DID) detection and identification capabilities, it may be possible to retrieve a forward-to number from the subscriber via his calling location (i.e., via his direct inward dialing digits received when he is located at a temporary forward-to call termination location such as temporary forward-to call termination location 108). In such a case, the subscriber may have to enter an identification code or personal identification (PIN) code to ensure that the calling party is, in fact, the subscriber to the enhanced call forwarding service.

In any case, processing next proceeds to Step S3-4. At Step S3-4 data and call switching processor 202 will determine whether or not the subscriber desires enhanced call forwarding according to the present invention (e.g., by playing a voice prompt to the subscriber to enter a particular DTMF sequence or by requesting the subscriber to speak his intention which may be received and processed by a speaker independent voice response unit (SIVRU). If not, processing proceeds to Step S3-5 where the subscriber will replace his handset on his cradle or otherwise indicate that he has concluded setting enhanced feature parameters (e.g., by pressing the "#" key on his telephone station keypad, etc.) and future calls will be forwarded to the forward-too number indefinitely.

Processing ends at Step S3-6.

If at Step S3-4 the subscriber desired enhanced call forwarding according to the present invention, processing proceeds to the top of FIG. 3B.

At the top of FIG. 3B and at Step S3-7, a determination will be made as to whether or not the subscriber hung up his handset thereby indicating that he changed his mind and did not want to enable the enhanced call forwarding features of the present invention. If the determination is negative (i.e., he did not hang up his handset, processing proceeds to Step S3-8 where the subscriber will be prompted to enter a period of time that enhanced call forwarding according to the present invention will remain in effect. Such a prompt may take the form of an audible voice sequence such as "Please enter a time period during which enhanced call forwarding will remain in effect". The subscriber may then enter a time period such as "1" (one) for one hour or "3" (three) for three hours via his telephone station keypad to indicate that he intends call forwarding to remain in effect for such a period of time. The subscriber can either use his keypad on his telephone station to generate corresponding DTMF signals, or if switching facility 104 is so equipped, the subscriber may speak a period of time such as "one hour" (in a given language such as English, French, etc.) to an SIVRU. The use of such voice response units will be readily apparent to those skilled in the art. Thereafter, processing proceeds to Step S3-9 where call forwarding will remain in effect for the subscriber's specified period of time.

Processing next proceeds at the top of FIG. 3C and, in particular, at Step S3-10. At Step S3-10, and after the subscriber's specified period of time has expired, switching facility 104 and, in particular, data and call switching processor 202 (FIG. 2) will initiate a notification call to be routed to the subscriber at his specified temporary forward-to call termination location 108, indicating that his earlier specified period of time has expired.

The initiation and routing of automatically generated telephone system calls will be readily apparent to those skilled in the art. For example, many telephone service providers offer pager notification calls as part of their voice mail services. Such calls allow a subscriber to a voice mail service to receive an automatic, switch-generated pager notification call after the subscriber's voice mail box has received a voice mail message. The notification call that is automatically generated within the present invention may be implemented in a way that is similar to such pager notification.

It should be understood that the structure of the present invention and the operations that are now being described could be modified to allow the subscriber to enter a setting that could indicate a period of time before expiration of a timer that the subscriber will be notified that his specified time period is about to expire. For example, the subscriber could indicate that he wishes to receive a notification call at least five minutes before the effective period of call forwarding is about to expire. Additionally, the present invention also could be modified to allow the subscriber to indicate and set a number corresponding to the number of notification calls he desires to receive.

In any case, at Step S3-11, a determination will be made as to whether or not the notification call was completed and whether or not the subscriber received such a notification call. If not, processing will proceed to Step S3-12 where enhanced call forwarding according to the present invention will be terminated and future calls will be routed to the subscriber's normal call termination location 106.

Processing ends at Step S3-13.

If at Step S3-11 the subscriber did receive the notification call, a determination will be made as to whether or not a subscriber desires to reestablish enhanced call forwarding parameters according to the present invention (e.g., time periods, forward-to numbers, etc.). If not, processing proceeds to Step S3-12 as described above.

If at Step S3-16 the subscriber desired to re-establish call forwarding parameters, processing proceeds again at Step S3-7 as illustrated at the top of FIG. 3B.

If at Step S3-7 as described above, the subscriber hung up his handset, call forwarding will be placed into effect for a default period of time (e.g., 12 hours, or any other amount of time—in an initial setup routine associated with a subscriber's particular call forwarding parameters, a subscriber could be queried to establish his own personal default period of time (e.g., 3.5 hours or any other amount of time)) and processing will then end at Step S3-15. Of course, the sequence of operations illustrated in FIG. 3C, could also be duplicated at Step S3-15 instead of ending processing.

Figure 4:
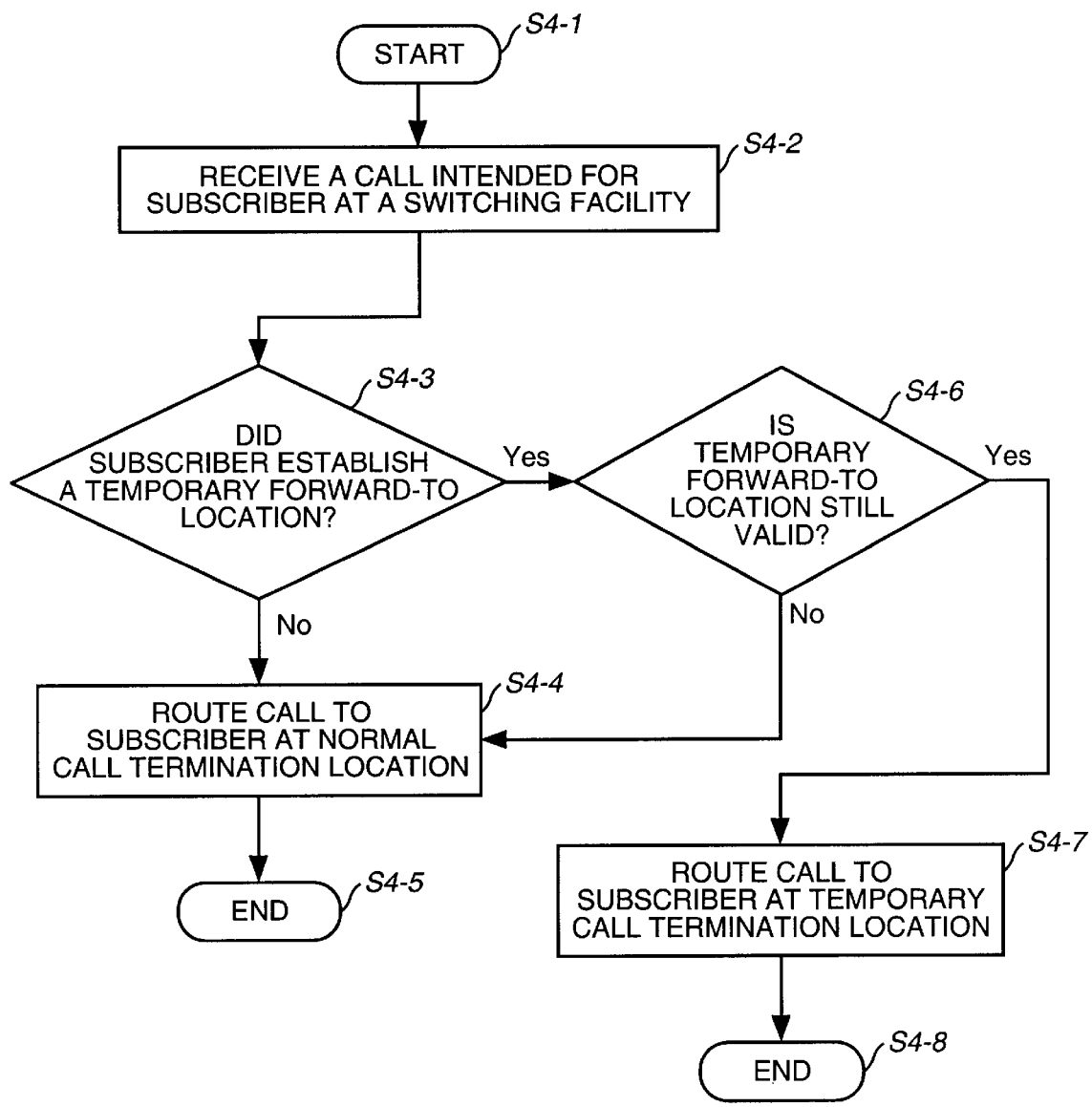
FIG. 4 is a flowchart that illustrates the operations associated with routing a call which may be forwarded within the system depicted in FIG. 1 according to a preferred embodiment of the present invention.

Referring now to FIG. 4, depicted therein is a flow chart that illustrates the operations of switching facility 104 within system 100 which are associated with routing a call which may be forwarded according to a preferred embodiment of the present invention. In particular, processing starts at Step S4-1 and immediately proceeds to Step S4-2.

At Step S4-2, a call intended for a subscriber is received at a switching facility such as switching facility 104. Thereafter, at Step S4-3, a determination will be made as whether not the subscriber established a temporary forward-to call termination location such as a temporary forward-to call termination location 108 at which to receive calls. If not, processing proceeds to Step S4-4 where calls will be routed to the subscriber at his normal call termination location 106.

Processing ends at Step S4-5.

If at Step S4-3 the subscriber established temporary forward-to call termination location 106, processing proceeds to Step S4-6 where a determination will be made as to whether or not the temporary forward-to call termination location is still valid or in effect (i.e., if an associated timer that has been established by a subscriber is still in effect and/or still has time remaining, or if an associated default period of time has expired). If not, processing will then proceed to the sequence defined at Steps S4-4 and S4-5, which were described above.

If a temporary forward-to call termination location 108 is still valid and in effect as determined at Step S4-6, processing proceeds to Step S4-7 where the call will be routed within call switching facility 104 and, in particular, within switching sub-system 105, to the subscriber's temporary call termination location 106.

Processing ends at Step S4-8.

As noted above, although call forwarding is the preferred enhanced telephony feature to which the drawing figures and the aforementioned detailed discussion are directed, the present invention is equally applicable to other enhanced telephony features including, but not limited to, call waiting, call blocking, etc. For example, a conventional call waiting service feature may be substituted for call forwarding and, in so doing, the present invention would allow subscribers to establish call waiting for a period of time and then receive a notification call upon the expiration of the time period. Thereafter, the subscriber could be prompted to re-establish timing parameters to extend his call waiting feature.

Additionally, a subscriber (e.g., a parent) may want to temporarily turn off or block 900 number access to prevent corresponding calls from telephone stations within his home during particular times. In accordance with the present invention, the subscriber could prevent 900 number calls for a period of time and then receive a notification call upon the expiration the time period. Additionally, the subscriber, upon receiving the notification, may change the parameters that affect 900 number access from telephone stations within the subscriber's home.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method for processing a call in a telephone call processing system, comprising the steps of:

receiving an instruction from a subscriber to a call forwarding service provided within said telephone call processing system to forward calls intended for said subscriber to a call termination location for a particular period of time;

receiving a call intended for said subscriber;

routing said call to said call termination location; and initiating and routing a notification call to said call termination location after said particular period of time expires, said notification call intended to be received by said subscriber at said call termination location and to notify said subscriber that said particular period of time has expired.

2. The method according to claim 1, further comprising the steps of:

receiving an additional period of time from said subscriber after said subscriber has received said notification call at said call termination location; and initiating and routing a subsequent notification call to said call termination location after said additional period of time expires, said subsequent notification call intended to be received by said subscriber at said call termination location and to notify said subscriber that said additional period of time has expired.

3. The method according to claim 2, wherein said subsequent notification call is automatically generated by a switching system within said telephone call processing system.

4. The method according to claim 1, wherein said instruction includes a dialing sequence corresponding to said call forwarding service provided within said telephone call processing system.

5. The method according to claim 1, wherein said notification call is automatically generated by a switching system within said telephone call processing system.

6. The method according to claim 1, wherein said call intended for said subscriber is a voice call.

7. The method according to claim 1, wherein said instruction includes a network address within said telephone call processing system that is maintained at said call termination location.

8. A telephone call processing system, comprising:

a data storage sub-system for storing call routing and forwarding information; and a data processing and call switching system coupled to said data storage sub-system and operable to receive an instruction from a subscriber to a call forwarding service provided within said telephone call processing system to forward calls intended for said subscriber to a call termination location having a network address for a particular period of time, to store said network address in said data storage sub-system, to receive a call intended for said subscriber, to retrieve said network address from said data storage sub-system in response to said call, to route said call to said network address, and to initiate and route a notification call to said network address after said particular period of time expires, said notification call intended to be received by said subscriber at said call termination location and to notify said subscriber that said particular period of time has expired.

9. The system according to claim 8, wherein said instruction includes a dialing sequence corresponding to said call forwarding service provided within said telephone call processing system.

10. The system according to claim 8, wherein said notification call is automatically generated.

11. The system according to claim 8, wherein said call intended for said subscriber is a voice call.

12. A method for providing a call forwarding service within a telephone call processing system, comprising the steps of:

setting a network address and a time period during which said network address will remain in effect in response to a corresponding instruction from a subscriber to said call forwarding service; and causing a time period termination notification call to be initiated and routed to said network address after said time period expires, said time period termination notification call intended to be received by said subscriber at said network address and to notify said subscriber that said time period has expired.

13. The method according to claim 12, wherein said instruction is a dialing sequence including a series of digits corresponding to a call forwarding service provided within said telephone call processing system.

14. The method according to claim 12, further comprising a step of resetting said time period during which said call termination address will remain in effect in accordance with a corresponding reset instruction from said subscriber after said subscriber received said time period termination notification call.

15. The method according to claim 12, wherein said call termination address is a telephone number specified by said subscriber.

16. The method according to claim 12, wherein said time period is specified by said subscriber by dialing a numeric value into a telephone station.

17. A method for providing an enhanced call processing service within a telephone call processing system, comprising the steps of:

initiating an enhanced call processing service in response to a corresponding service request from a subscriber to said enhanced call processing service;

setting a time period during which said enhanced call processing service will remain in effect in response to a corresponding instruction from said subscriber; and causing a notification call to be initiated and routed to said subscriber to notify said subscriber that said time period has expired.

18. The method according to claim 17, wherein said enhanced call processing service is a call forwarding service.

19. The method according to claim 17, wherein said enhanced call processing service is a call waiting service.

20. The method according to claim 17, wherein said enhanced call processing is a call blocking service.

21. The method according to claim 17, wherein said service request is a dialing sequence containing a plurality of digits corresponding to said enhanced call processing service.

22. The method according to claim 17, further comprising the step of resetting said time period to include an additional amount of time during which said subscriber intends to have said enhanced call processing service remain in effect.

23. A telephone call processing system having a call forwarding capability, comprising:

a data storage sub-system for storing a network address and a time period during which said network address will remain in effect, said network address and said time period being established by a subscriber to a call forwarding service; and a data processing and call switching system coupled to said data storage sub-system and operable to cause a time period termination notification call to be initiated and routed to said network address after said time period has expired, said time period termination notification call intended to be received by said subscriber at said network address and to notify said subscriber that said time period has expired.

24. The telephone call processing system according to claim 23, wherein said network address and said time period are established by said subscriber by dialing a series of digits into a telephone station coupled to said telephone call processing system.

25. The telephone call processing system according to claim 23, wherein said network address is a telephone number.

26. The telephone call processing system according to claim 23, wherein said data processing system is further operable to route calls to said subscriber at said network address during said time period.

27. The telephone call processing system according to claim 23, wherein said data processing system is further operable to play a voice prompt during said time period termination notification call when said subscriber receives said time period termination notification call.

28. A telephone call processing system having an enhanced call processing capability, comprising:

a data storage sub-system for storing a time period during which an enhanced call processing service will remain in effect, said time period being established by a subscriber to said enhanced call processing service; and a data processing and call switching system coupled to said data storage sub-system and operable to initiate said enhanced call processing service in response to a corresponding service request received from said subscriber and to cause a notification call to be initiated and routed to said subscriber to notify said subscriber that said time period has expired.

29. The telephone call processing system according to claim 28, wherein said time period is established by said subscriber by dialing a series of digits into a telephone station coupled to said telephone call processing system.

30. The telephone call processing system according to claim 28, wherein said data processing system is further operable to play a voice prompt during said time period termination notification call when said subscriber receives said time period termination notification call.

\* \* \* \* \*